United States Patent [19]
Schefte et al.

[11] Patent Number: 6,078,787
[45] Date of Patent: Jun. 20, 2000

[54] ANTENNA SYSTEM

[75] Inventors: Henry Schefte, deceased, late of Skärholmen, by Ann-Margret Schefte, heir; Sven Anders Gösta Derneryd, Hisings Backa; Jan Staffan Reinefjord, Djursholm, all of Sweden

[73] Assignee: Telefonaktiebolaget LM Ericsson (publ), Stockholm, Sweden

[21] Appl. No.: 09/079,841

[22] Filed: May 15, 1998

[30] Foreign Application Priority Data

May 16, 1997 [SE] Sweden ................................ 9701848

[51] Int. Cl.⁷ ...................................................... H04Q 7/36
[52] U.S. Cl. ............................ 455/16; 455/21; 455/562; 455/446; 343/700 MS; 341/176
[58] Field of Search ................................ 455/16, 17, 95; 343/700 MS, 702, 872, 893, 713

[56] References Cited

U.S. PATENT DOCUMENTS

| | | | |
|---|---|---|---|
| 5,281,970 | 1/1994 | Blaese | 341/176 |
| 5,628,049 | 5/1997 | Suemitsu | 455/11.1 |
| 5,890,055 | 3/1999 | Chu et al. | 455/16 |

FOREIGN PATENT DOCUMENTS

4330436 A1   5/1995   Germany .

OTHER PUBLICATIONS

*Patent Abstracts of Japan*, vol. 16, No. 392, E–1251; Abstract of JP 4–127728 A (NEC Corp.), Apr. 28, 1992.
Bengtsson, Rune; *PCT International–Type Search Report*, Feb. 23, 1998, pp. 1–3.

*Primary Examiner*—Don Wong
*Assistant Examiner*—James Clinger
*Attorney, Agent, or Firm*—Jenkens & Gilchrist, P.C

[57] ABSTRACT

An antenna system (100) at a mobile communication station (150) comprises a main unit (101) which comprises at least one network antenna (102), a relay antenna (103) for communication with the mobile station (150) and an interface unit (104) connected to the network antenna (102) and the relay antenna (103). The antenna system (100) also comprises a local antenna (105) in the mobile communication station (150) for communication with the relay antenna (103) in the main unit (101). The main unit (101) is attachable to and detachable from the mobile communication station (150), while at the same time the relay antenna (103) and the local antenna (105) lack galvanic contact. In an attached state, the relay antenna (103) and the local antenna (105) are electrically connected to each other by means of a capacitive connection, and in a detached state, the relay antenna (103) and the local antenna (105) are electrically connected to each other by an electric far-field connection.

18 Claims, 3 Drawing Sheets

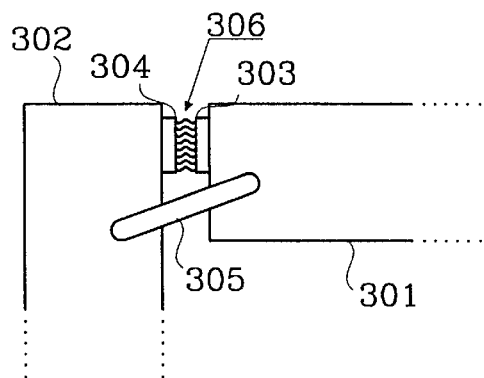
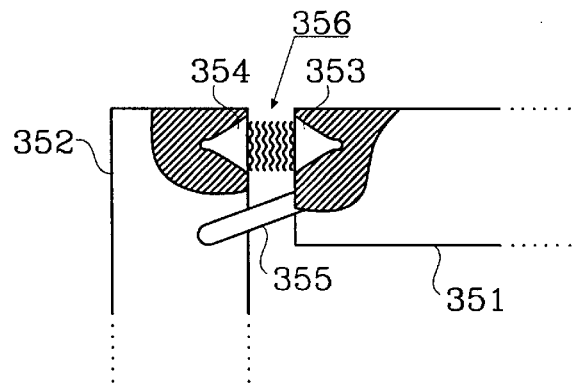
FIG. 3A  FIG. 3B
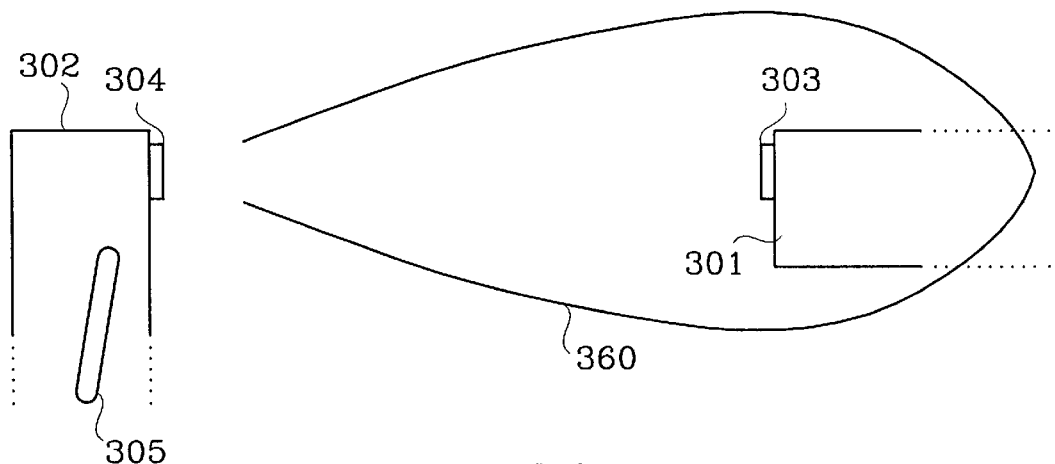
FIG. 3C

ANTENNA SYSTEM

TECHNICAL FIELD OF THE INVENTION

The present invention relates to antennas in mobile telecommunication systems, and more particularly to antenna units attachable to mobile communication stations.

DESCRIPTION OF RELATED ART

In mobile telecommunication systems, a consequence of the mobility of the communicating stations is often that radio contact is difficult to establish or maintain. A typical situation illustrating this, is when a mobile user who has established contact with the network, via e.g. a radio base station, suddenly enters a location where path loss or multipath fading severely weakens the received radio signals. Obviously, corresponding effects may also affect transmission of signals from a mobile station which enters such a location.

Another example of a scenario in which maintaining or establishing contact from a mobile station is problematic, is in direct mobile to satellite communication systems. Due to the great distance between mobile station and satellite, there is a need for a directional concentration of the energy in the radio waves, unless the supply of radio power is large enough to allow an isotropic radiation pattern. Current mobile stations, however, have a limited power capacity, and directional concentration is hence essential. However, a directional concentration of the radio waves requires that obstacles along the line of sight between the mobile station and the satellite must to be avoided.

A way of counteracting this problem is to utilize a repeater station in relatively close proximity to the mobile station. In order not to reduce the mobility of the mobile station, however, the repeater station must also be mobile; mobile at least in a sense that a user of the mobile station should be able to place and replace the repeater with a minimum of effort. The current demand for extremely small hand held units inevitably leads to a demand that, if a repeater is necessary, it must be easily attachable to and detachable from the mobile station and also be very small and lightweight.

As an example, representing current state-of-the-art, a detachable repeater antenna system is disclosed in the Japanese patent application JP4-127728 (A). A repeater antenna can be detached from a mobile telephone and placed in a position where radio signals from a base station can reach the repeater.

A drawback of the solution presented in JP4-127728 (A) is that the communication between the repeater unit and the mobile telephone takes place through physically different channels depending on whether the repeater is attached to the phone or not. When attached, communication takes place through connection means that are in galvanic contact. When detached, communication takes place through an extended antenna. This solution requires two different signal paths through the repeater to the mobile thelephone and it is thus complicated.

Another example of an attachable antenna is disclosed in the German patent application DE4330436. A mobile telephone has an attachable and detachable main antenna unit for communication with a mobile network. Antenna modules for local communication between the phone and the main antenna unit are discussed in general terms.

In the above mentioned DE4330436 it is not disclosed how communication between the antenna units can be obtained in an energy efficient manner irrespective of the antenna modules being close to each other or distant from each other.

SUMMARY OF THE INVENTION

A problem solved by the present invention is understood by considering the drawbacks of the solution representing state-of-the-art. There is a need for a design of a separable antenna unit in the signal path between the mobile unit and the antenna, capable of directional concentration of radio wave energy, without need for physical connectors.

Accordingly, an object of the present invention is to obtain a separable repeater unit which utilizes the same means for communication with the mobile unit irrespective of it being attached to or detached from the mobile unit.

Another object of the present invention is to obtain a separable repeater unit which can communicate with the mobile station without interfering with communication taking place between the repeater unit and a base station or satellite.

An antenna system according to the present invention solves these problems by means of a mobile communication station with a separable antenna unit capable of being capacitively coupled to the mobile station as well as being capable of communicating with the station via an electromagnetic far-field.

More specifically, the antenna system at the mobile station comprises a main unit which comprises at least one network antenna, a relay antenna for communication with the mobile station and an interface unit connected to the network antenna and the relay antenna. The antenna system also comprises a local antenna in the mobile communication station for communication with the relay antenna in the main antenna unit. The main unit is attachable to and detachable from the communication station, while at the same time the relay antenna and the local antenna lack galvanic contact. In an attached state, the relay antenna and the local antenna are electrically connected to each other by means of a capacitive connection, and in a detached state, the relay antenna and the local antenna are electrically connected to each other by an electric far-field connection.

An advantage of the present invention is that communication between the mobile station and the main antenna unit is realized with the same relay- and local antennas, whether the units are mechanically attached to each other or not.

Another advantage is that communication between the mobile station and the main antenna unit is realized with the same efficiency with respect to radiated power, whether the units are mechanically attached to each other or not.

Yet another advantage is that communication between the mobile station and the main antenna unit can be realized with a directional concentration of the radiation pattern between the units.

BRIEF DESCRIPTION OF THE DRAWINGS

FIG. 3A shows a first schematic view of an antenna unit, comprising patch antennas, attached to a mobile communication unit.

FIG. 3B shows a second schematic view of an antenna unit, comprising horn antennas, attached to a mobile communication unit.

FIG. 3C shows a schematic view of an antenna unit detached from a mobile communication unit.

DETAILED DESCRIPTION OF PREFERRED EMBODIMENTS

Figure 1:
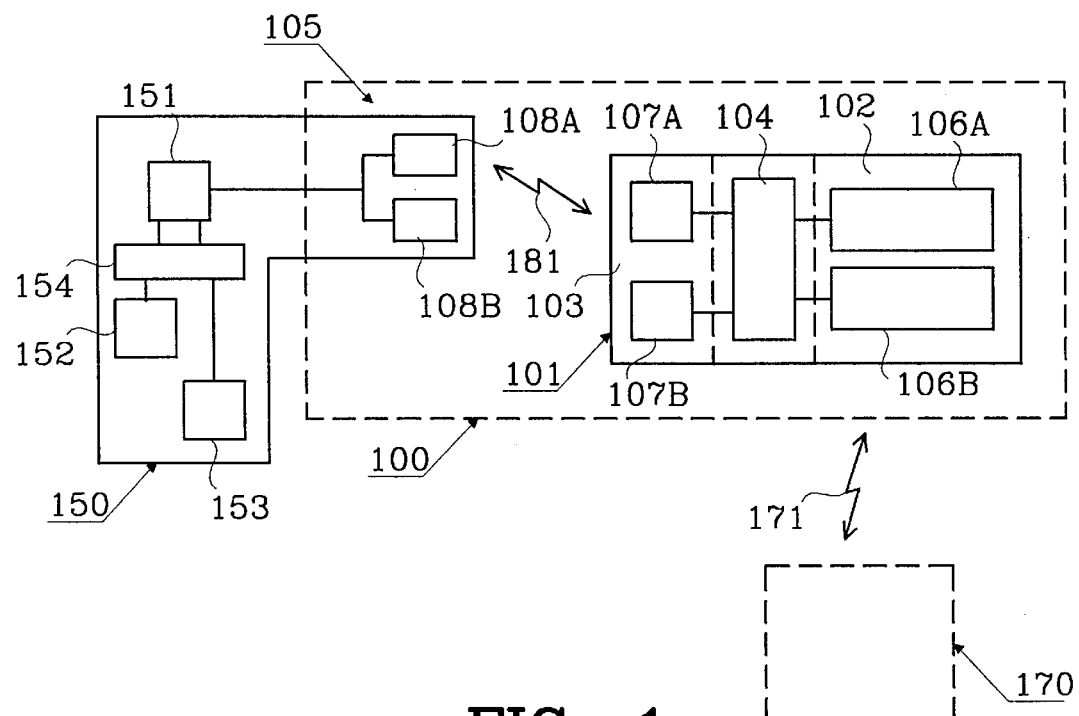
FIG. 1 shows a schematic block diagram of an antenna system according to the invention.

FIG. 1 shows a schematic block diagram of an antenna system 100, a mobile communication station 150 and a telecommunication network 170 with which the station is communicating via the antenna system 100. The antenna system 100 is physically divided between the communication station 150 and a main antenna unit 101.

The communication station 150 comprises an input unit 152 and an output unit 153, both in connection with a control unit 154. To the control unit 154, a local antenna 105 is connected through a radio unit 151. The local antenna comprises a transmitting local antenna sub-unit 108A and a receiving local antenna sub-unit 108B. In a simple implementation, the input unit 152 and the output unit 153 is in the form of a microphone and a speaker respectively. The control unit 154 represents in such a case all necessary signal processing functions, known in the art, that a user of the station 150 may need to communicate.

The main antenna unit 101 comprises a network antenna unit 102 which comprises a transmitting network antenna sub-unit 106A and a receiving network antenna sub-unit 106B. The network antenna sub-units 106A,106B are connected to an interface unit 104. Also connected to the interface unit 104 is a relay antenna unit 103 which comprises a transmitting relay antenna sub-unit 107B and a receiving relay antenna sub-unit 107A. The network antenna 102 receives and transmits radio signals via a radio connection 171 with the network 170. The network 170 may contain communication units, not shown in FIG. 1, according to any configuration in the known art, as will be described schematically below in connection with FIG. 2. The interface unit 104 performs the function of relaying the signals from the network antenna 102 and the relay antenna 103. In a situation where the network radio connection 171 comprises a first radio signal frequency, and the local connection 181 utilizes a second frequency interval, the interface unit 104 transforms between the two frequency intervals. Transformation between frequency intervals is known in the art and will hence not be discussed in any more detail.

The relay antenna 103 in the main antenna unit 100 receives and transmits signals via a local electromagnetic connection 181 between the communication station 150 and the main antenna unit 101. The local connection 181 will be discussed further below in connection with FIGS. 3A–C.

Note that both the relay antenna 103 and the local antenna 105 in this example each comprises a receiving antenna 107A, 108B and a transmitting antenna 108A,107B. However, depending on the functions of the control unit 154 in the communication station 150 and the interface unit 104 in the main antenna unit 101, it is possible to have single bidirectional antenna units in both the local antenna 105 and the relay antenna 103. Time division multiplex, which is well known in the art, can be used in order to switch between transmission and reception during communication between the local 105 and the relay 103 antennas. In other words, the present invention is not restricted to any particular system for mobile communication. It can be utilized in analogue frequency multiplex systems (FDMA) such as NMT and AMPS, as well as digital time multiplex (TDMA) such as GSM and D-AMPS and code multiplex (CDMA) systems.

Since both the communication station 150 and the main antenna unit 101 comprise transmitters and other signal processing means, there is obviously a need for a power supply. However, arrangements for supplying power electrical equipment of this character is well known in the art, e.g. in the form of batteries. It therefore understood that the communication station 150 and the main antenna unit 101 both comprise power supply units, the particular implementation of which is of minor importance for the purpose of illustrating the present invention.

Figure 2:
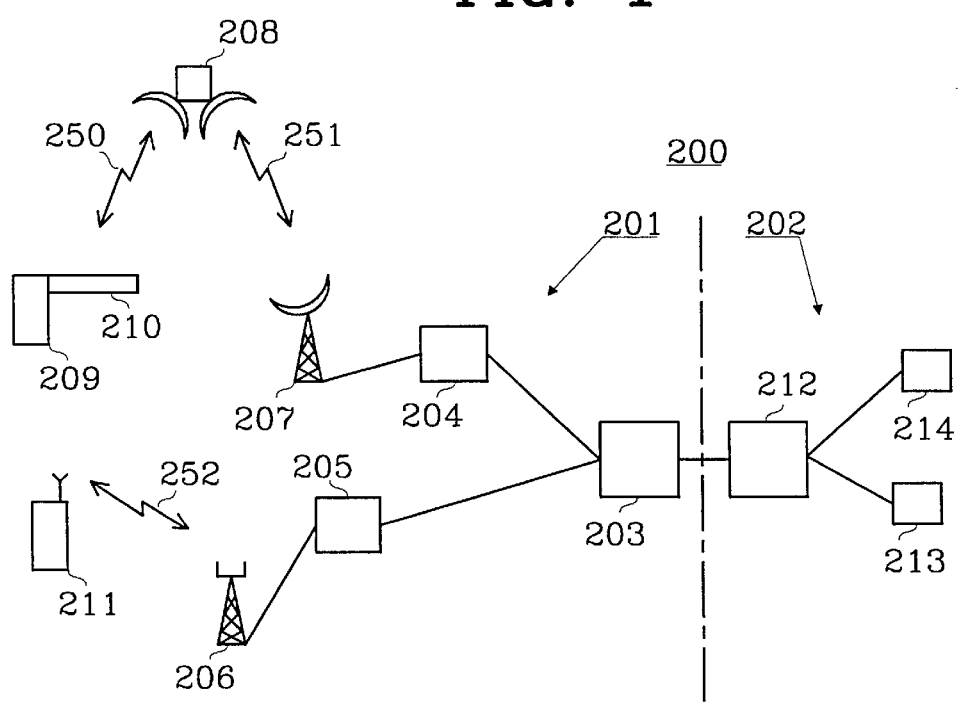
FIG. 2 shows a telecommunication system in which an antenna system according to the invention is implemented.

FIG. 2 illustrates in some detail components of a telecommunication system 200 which can comprise the network 170 introduced above in connection with FIG. 1. A mobile communication network 201 comprises a mobile switching centre 203 to which a land base station 205 and a satellite base station 204 is connected. The land base station 205 connects a radio station 206 with the mobile switching centre 203, and the satellite base station 204 connects a satellite ground station 207 with the mobile switching centre 203. A first mobile subscriber unit 211 is communicating via a radio connection 252, through the radio station 206 and the radio base station 205, with any other subscriber in the system 200. Likewise, a second mobile subscriber unit 209 is communicating via a first satellite radio connection 250, through a satellite 208, via a second satellite radio connection 251, through the satellite ground station 207 and the satellite base station 204, with any other subscriber in the system 200. The second mobile subscriber unit 209 is in communication with the satellite 208 through an antenna unit 210 as described above in connection with FIG. 1. The first mobile subscriber unit 211 may be of any type, as is well known in the art. A detailed description of an implementation of the methods of communication in the network 201 is outside the scope of the present invention. Any system known in the art, analog or digital, may be used. Although no particular radio frequency interval is prefered for the network communication, it is obvious that any frequency involved in the satellite connections 250 and 251 preferably is in the microwave part of the radio spectrum. This is due to the fact that there is a need for directional concentration of the radio energy as discussed above.

The communication system 200 also comprises a telephone network 202, comprising an exchange 212 and two fixed subscriber units 213,214. These telephone network components are shown only to illustrate the general character of the system 200 in which the present invention may be utilized.

Naturally, the mobile network 201 may comprise any number of base stations and mobile subscriber units. In fact, it is common in networks in the known art that networks of thousands of base stations serve millions of mobile subscribers having mobile communication stations.

FIGS. 3A, 3B and 3C illustrate the present invention in terms of an electromagnetic connection 306,356 between a mobile communication station 302,352 and a main antenna unit 301,351, corresponding to the local connection 181 in FIG. 1. The communication station 302,352 as well as the main antenna unit 301,351 are only partly shown schematically and they both comprise the means disclosed in connection with FIG. 1. Although communication between the communication station 302,352 and the main antenna unit 301,351 implies that there is a connection between the main antenna 301,351 and other units in a network, this is not illustrated since it is already well known in the art.

FIG. 3A shows the communication station 302 on which a relay antenna unit 304, corresponding to 108A,108B in FIG. 1, is an integral part. In this case the relay antenna 304 is a microstrip patch. By means of an attachment unit 305, the main antenna unit 301 is mechanically attached to the communication station 302. The main antenna unit 301 comprises a local antenna unit 303, corresponding to 107A, 107B in FIG. 1, also in the form of a microstrip patch. Although the communication station 302 and the main antenna unit 301 is attached to each other, there is no galvanic contact between them. An electric connection in the form of an electromagnetic field 306 is present between the patch antennas 303,304. The proximity of the patches 303, 304 to each other means that the patches 303,304 are capacitively coupled.

As is well known in the art, the patch antenna elements can have square, rectangular or circular shape and preferably having a resonant dimension about half a wavelength. The patches 303,304, are located directly opposite each other, on the main antenna unit 301 and the communication station 302 respectively, and they are separated by a distance less than the resonant dimension in order to limit spurious radiation. Any spurious radiation is an unwanted leakage which can be further reduced by the introduction of quarter wavelength chokes, as is known in the art.

FIG. 3B shows a situation similar to the one shown in FIG. 3A. Here the electromagnetic field 356 is between two horn antennas 353,354 on the main antenna unit 351 and the communication station 352 respectively. As is known in the art the horns couple like apertures, whereas patches couple like capacitors.

FIG. 3C shows a situation in which the main antenna unit 301 is mechanically detached from the communication station 302. As in the example discussed in connection with FIG. 3A, the relay antenna 303 is in the form of a microstrip patch, as well as the local antenna 304 being in the form of a microstrip patch. The attachment unit 305 is detached from the main antenna unit 301, and as in previous examples there is no galvanic contact between the units 301,302. In this case there is an electric connection between the two units 301,302 in which the electromagnetic far-field is utilized. In FIG. 3C the far-field has been indicated as a lobe 360 with clearly defined directional concentration. Only one lobe 360 is shown in the figure. However, this is only for the sake of clarity. The far-field connection between the units 301,302 can be illustrated with lobes, representing transmission and reception, originating at both units 301,302 as is known in the art. Also known in the art is the shape and direction of the lobe 360, which is governed by the detailed implementation of the antenna elements.

Figure 4:
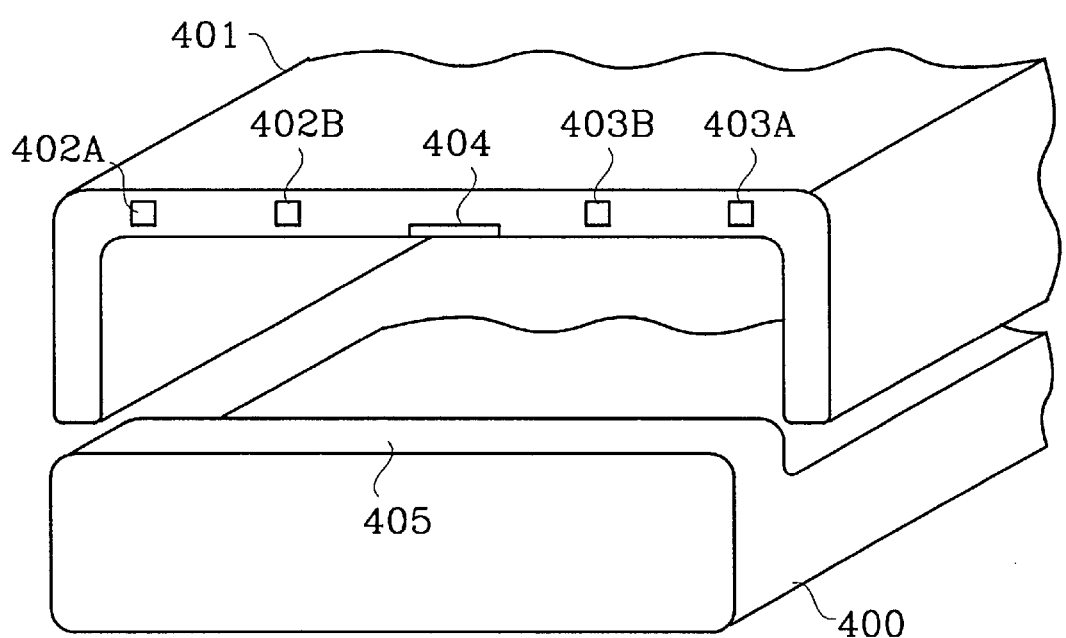
FIG. 4 shows a schematic perspective view of an antenna unit comprising patches, detached from a mobile communication station.

FIG. 4 shows a part of a mobile communication station 400, e.g. a mobile phone, and a part of an attachable and detachable main antenna unit 401. A mechanical attachment unit 404 permits the two units to be mechanically connected. In the figure it is also shown how relay antennas (103 in FIG. 1) can be arranged at one end of the main antenna unit 401. Rectangular patches for transmission 402A,402B are shown together with patches for reception 403A,403B. However, as in previous examples, it is not necessary to have separate patches for reception and transmission. The patches may each be used for transmission as well as reception of signals, depending on the function of the signal processing means that supply the patches with signals. The communication station 400 also comprises patches that correspond to the local antenna unit 105 (FIG. 1). However these are arranged behind the flange 405, and are not visible in FIG. 4.

What is claimed is:

1. An antenna system for a mobile communication station in a mobile telecommunication network comprising:
   a main unit which includes at least one network antenna for communication in the network, said main unit being mechanically attachable to and detachable from the mobile communication station for facilitating communication between the mobile communication station and the network;
   said main unit including a relay antenna for communication with the mobile communication station;
   said main unit including an interface unit connected between the network antenna and the relay antenna; and
   a local antenna for communication with the relay antenna, said local antenna being included in the mobile communication station, the relay antenna and the local antenna coupled for communication with one another, both when the main unit is mechanically attached to and detached from the mobile communication station, using a non-galvanic contact effectuated by mutual electromagnetic coupling both when the main unit is mechanically attached to and detached from the mobile communication station.

2. The antenna system according to claim 1, further wherein, while the main unit and the mobile communication station are in an attached state, the relay antenna and the local antenna are electrically connected to each other by a near-field connection.

3. The antenna system according to claim 2, wherein, the near-field is a capacitive connection.

4. The antenna system according to claim 2, wherein, the near-field is an inductive connection.

5. The antenna system according to claim 1, further characterized in that, while the main unit and the mobile communication station are in the detached state, the relay antenna and the local antenna are electrically connected to each other by an electromagnetic far-field connection.

6. The antenna system according to claim 5, wherein, the far-field is directionally concentrated in relation to a location of one of said relay antenna and said local antenna.

7. The antenna system according to claim 1, wherein the relay antenna and the local antenna comprise patch antennas.

8. The antenna system according to claim 1, wherein, the relay antenna and the local antenna comprise horn antennas.

9. The antenna system according to claim 1, wherein, the relay antenna and the local antenna comprise aperture antennas.

10. The antenna system according to claim 1, wherein, communication in the network occurs during a main radio frequency interval determined by the network and the communication between the relay antenna and the local antenna takes place during a local frequency interval different from the main frequency interval.

11. The antenna system according to claim 10, wherein, the local communication radio frequency interval has a typical frequency corresponding to a typical wavelength, which wavelength is of the same order of magnitude as the physical dimensions of the antennas.

12. The mobile communication station and the antenna system according to claim 1, wherein, said communication station is capable of communicating in a mobile telecommunication system.

13. The mobile communication station and the antenna system according to claim 1, wherein, said communication station is capable of communicating in a mobile satellite telecommunication system.

14. A method of radio communication in a mobile telecommunication network by means of an antenna system at a mobile communication station, said method comprising the steps of:

mechanically attaching a main unit, which includes at least one network antenna for communication in the network, to the mobile communication station; and establishing between the mobile communication station and a station in the network a radio connection wherein a non-galvanic electromagnetic coupling connects a local antenna in the mobile communication station with a relay antenna in the mechanically attached main unit, including interfacing between the relay antenna and the network antenna for communication therebetween; and selectively mechanically disconnecting the main unit from the mobile communication station but still maintaining the established radio connection between the mobile communication station and the station in the network, with one of the main unit and the mobile communication station located within an electromagnetic far-field with respect to the other of the main unit and the mobile communication station.

15. The method of radio communication according to claim 14, wherein, the respective far-fields are directionally concentrated in relation to the relative locations of the mobile communication station and the main unit.

16. The method of claim 14, including the network antenna communicating bidirectionally in the network, the local antenna communicating bidirectionally with the relay antenna, and said interfacing step including interfacing bidirectional communications between the network antenna and the relay antenna.

17. The method of claim 14, wherein the non-galvanic electromagnetic coupling is a capacitive coupling.

18. The antenna system of claim 1, wherein said network antenna communicates bidirectionally in the network, said interface unit provides a bidirectional communication interface between the network antenna and the relay antenna, and the local antenna communicates bidirectionally with the relay antenna.

* * * * *